Patented June 1, 1943

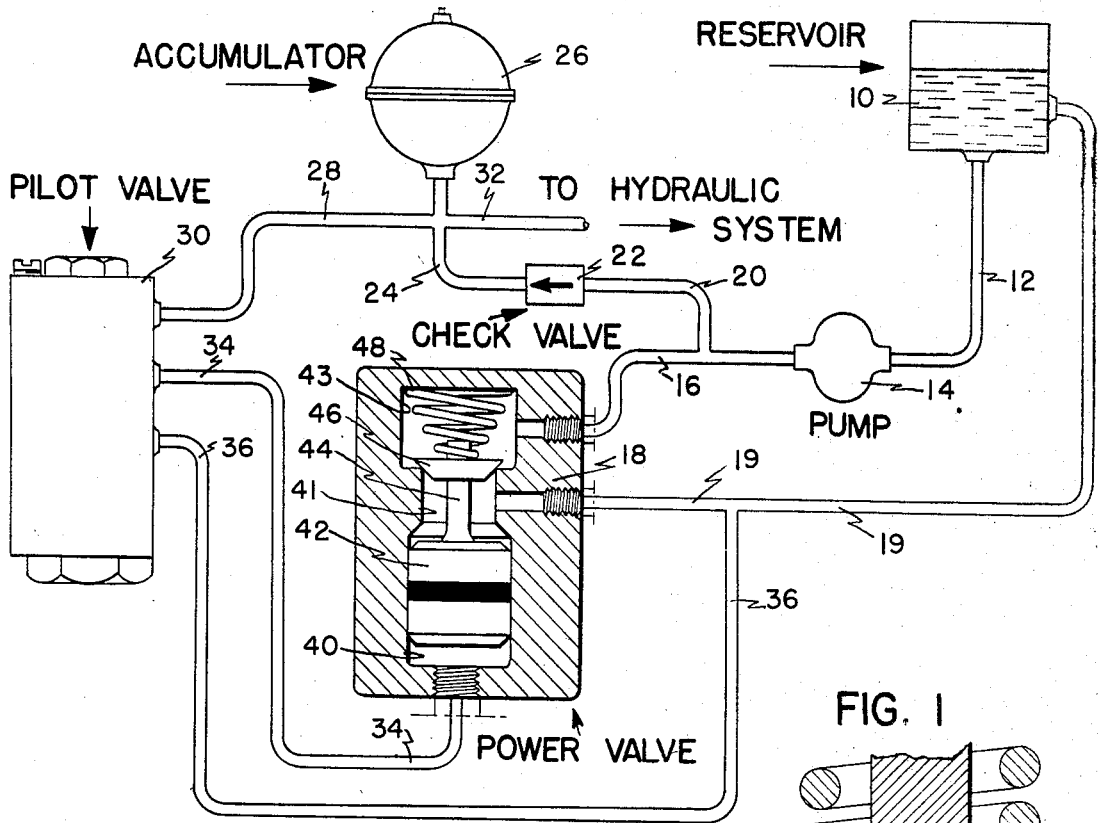
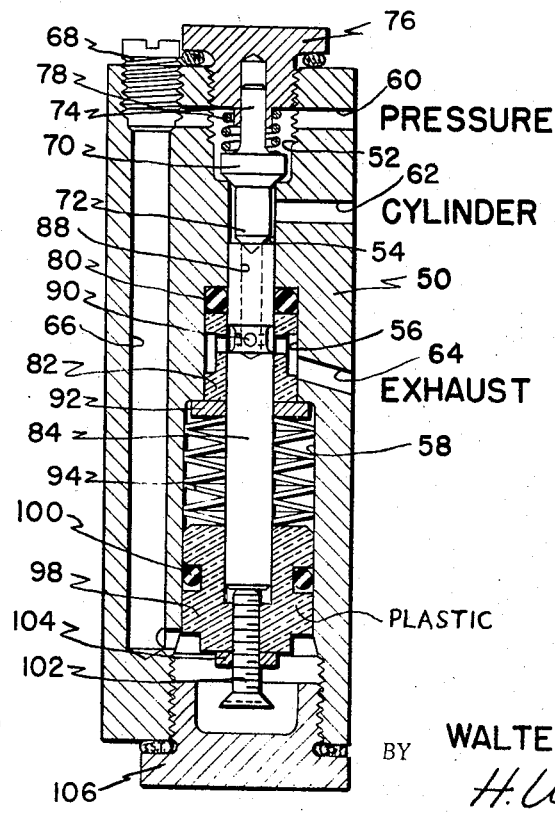

2,320,763

UNITED STATES PATENT OFFICE 2,320,763

PILOT VALVE

Walter C. Trautman, North Hollywood, Calif., assignor, by mesne assignments, to Bendix Aviation, Ltd., North Hollywood, Calif., a corporation of California Application November 29, 1941, Serial No. 420,975

4 Claims. (Cl. 277—21)

This invention relates to pilot valves and more particularly to a pilot valve of the poppet valve type.

It is an object of the invention to provide a satisfactory pressure responsive pilot valve element for use in fluid pressure systems.

It is another object of the invention to provide a pilot valve element having no leakage, and having extreme accuracy of performance in regard to the fluid pressure at which it is actuated.

Still another object is to provide a pilot valve element having its moving parts co-axially arranged for ease in machining and manufacture.

Another object is to provide an adjustable pressure responsive pilot valve which may be readily adjusted to operate at different pressures.

In the drawing forming a part of this specification:

Figure 1 is a diagram of a hydraulic system showing the pilot valve of this invention and showing its relation to the various units in a hydraulic system;

Figure 2 is a view in vertical section of the pilot valve element of Figure 1; and Figure 3 is an elevation view partly in section of an alternative double poppet construction for the valve of Figure 2.

Referring to Figure 1, hydraulic fluid is stored at atmospheric pressure in a reservoir 10, having a conduit 12 leading therefrom and connected to a power operated pump 14. The pump 14 delivers its output to a conduit 16 connected to a valve housing 18. Leading from valve housing 18 is an exhaust conduit 19 connected to the reservoir 10.

A branch conduit 20 leading from conduit 16 is connected to a check valve 22 which is in turn connected to a conduit 24 leading to an accumulator 26. Branching to the left from conduit 24 is a pressure conduit 28 leading to a pilot valve unit 30. Branching from conduit 24 to the right is a conduit 32 leading to any actuated hydraulic devices. Leading from pilot valve 30 is a conduit 34 connected to the bottom of valve housing 18. Also leading from pilot valve 30 is a conduit 36 connected to exhaust conduit 19.

Valve housing 18 has an axial recess at 40 having a restricted portion 41 and an enlarged upper portion 43. Recess 40 retains a piston 42 having a stem 44 leading from the top thereof which abuts against a poppet valve element 46 urged downwardly upon the restriction 41 forming its seat, by a coil spring 48. Pressure conduit 16 is connected with the recess 43 above the poppet valve element 46, and exhaust conduit 19 connects with recess 41 at a point below the poppet valve element 46. Conduit 34 is connected to the recess 40 at a point below the piston 42.

When the hydraulic system of Figure 1 is being operated, the pump 14 takes fluid from reservoir 10 and pumps it through conduits 16 and 20 and check valve 22 into the accumulator 26. Hydraulic devices connected to conduit 32 consume this fluid under pressure when they are actuated. If hydraulic fluid is not consumed at the rate at which the pump 14 delivers it, the pressure will build up in the accumulator until it has reached the point where it is necessary or desirable to stop the build-up of pressure. At this predetermined pressure, the pilot valve 30 is automatically operated by this fluid under pressure and causes fluid to flow through conduit 34 into valve housing 18. This fluid acts upon piston 42 to move it upwardly overcoming the pressure acting upon the poppet valve 46 which is of lesser area than the piston and opens the valve 46 permitting the high pressure fluid from conduit 16 to be by-passed into exhaust conduit 19 which will return it to the reservoir 10.

If hydraulic devices connected to conduit 32 are now operated the pressure in accumulator 26 and consequently in the entire hydraulic system will drop to a point to where it is desirable to build up the pressure again. This drop in pressure will cause pilot valve 30 to act automatically to cut off fluid flow into conduit 34 and to connect conduit 34 to exhaust conduit 36. This action causes pressure to be relieved on the bottom of piston 42 in valve housing 18 allowing poppet valve 46 to close, thus stopping the by-pass of pressure fluid to exhaust. Thus the pilot valve 30 causes fluid pressure to be by-passed at the desired high pressure and stops the by-pass of pressure fluid at a lower desired pressure.

The pilot valve element 30 comprising this invention may be used for other purposes than that disclosed in Figure 1, which is merely for purposes of illustration. For example, a pilot valve element 30 could cause an electrical switch to be opened or closed by suitable mechanism which switch might in turn control an electric motor which may be the motive power for a pump such as pump 14 in the hydraulic system of Figure 1. Thus the pilot valve 30 could control the supply of fluid to a hydraulic system directly, rather than control the by-pass of fluid under pressure from a pump which is continuously running. Various other uses for the pilot valve are contemplated by this invention and such uses as are mentioned are merely illustrative.

The pilot valve 30 is shown in detail in Figure 2. A valve housing 50 has an axial recess having an enlarged upper portion 52, a restricted intermediate portion 54, an enlarged intermediate portion 56, and a larger lower portion 58. A pressure inlet 60 is connected to the enlarged upper recess 52, a cylinder port 62 is connected to the restricted intermediate portion and an exhaust port 64 is connected to the enlarged intermediate portion 56. Formed in the left part of housing 50 is an axially parallel passage 66 connected to inlet 60 at the top and connected to the enlarged lower opening 58 at the bottom, and sealed by a plug 68 at the top.

Seated on the restriction between recess 52 and recess 54 is a double poppet element having an upper poppet 70 and a lower poppet 72 and an upper guide stem 74. The double poppet is guided by a closure cap 76 screwed into the open end of recess 52 and compressing a spring 78 downwardly upon the double poppet element. Fitted within the intermediate enlarged portion 56 is a sealing ring 80 of round cross section and a bushing 82 having holes therein to communicate the inside of the bushing with the exhaust port 64. Fitted in bushing 82 is a stem 84 having an axial bore 88 in its upper end and radial holes 90 communicating bore 88 with the outside. Fitted on the bottom end of stem 84 is a washer 92, a number of Belleville springs 94, and a plastic piston 98 circumferentially recessed to retain a sealing ring 100. An adjustment screw 102 passing through the bottom end of piston 98 adjusts the distance between piston 98 and stem 84, and is held in place by a locknut 104. A cap 106 seals the lower end of recess 58.

Referring to Figure 2, the pilot valve is operated by fluid under pressure entering port 60. The pressure is transmitted down passage 66 to act upon the bottom of piston 98, forcing the piston and the stem 84 upwardly until the stem contacts the lower poppet 72 thus sealing cylinder port 62 off from the exhaust port 64. When the pressure builds up further to overcome spring 94 and the seating pressure on poppet 70 the poppet 70 is opened, permitting fluid to pass into cylinder port 62 and thus actuate any desired device the operation of which is desired to be pressure responsive.

If the pressure delivered to port 60 should now drop, poppet valve 70 would seat thus cutting off flow of fluid to cylinder 62, trapping in cylinder port 62 fluid under the pressure at which the poppet 70 closed. If the pressure should drop still further the spring 94 will force the piston 98 downwardly until the lower poppet 72 unseats allowing cylinder port 62 to be connected to exhaust port 64. Any pressure responsive device operated by fluid from cylinder port 62 will now return to its original position.

From the operation thus far described, it is apparent that the differential between the pressure required to close lower poppet 72 and the pressure required to open upper poppet 70 is a fixed quantity "built into" the unit. As the pressure builds up, piston moves upwardly against the spring 94 until lower valve 72 is closed. Thereafter an increase in pressure has no effect upon the valve as a whole, until the increased pressure on piston 98 is great enough to overcome the fluid pressure seating upper poppet 70. The first cracking of upper poppet 70 relieves the seating pressure which results in an overbalance of the opening pressure, snapping the valve 70 wide open, eliminating fluttering. It is apparent that the pressure at which the lower valve 72 opens is dependent upon the rate of the spring 94 and the area of the piston 98. The opening pressure of the upper valve 70, however, is practically independent of the spring 94 as regards the effect of additional pressure, and is solely dependent upon the seating area of valve 70 relative to the area of piston 98.

If the effective fluid pressure now decreases, the spring 94 will force the piston 98 downwardly and the valve stem 84 will follow due to the action of poppet spring 78. When the effective pressure becomes low enough the upper poppet 70 will seat. A very minute additional lowering of the pressure will cause lower poppet 72 to open, causing the power valve 18 to return to its normal closed position. From the foregoing it will be apparent that the upper poppet 70 does not seat at the same pressure at which it opens, but rather at a lower pressure than the seating pressure by an amount represented by the mean effective pressure over the cross-sectional seating area of the upper poppet 70. This pressure obviously is the initial pressure at which the lower poppet 72 closed when the pressure of the system was increasing.

If it is desired to increase the differential pressure between the effective pressures at which upper poppet 70 opens and closes, which differential is equivalent to the differential at which lower poppet 72 closes relative to that at which upper poppet 70 opens, this may be done by adding the rate of the spring to the determining factors for opening the upper poppet 70. A poppet arrangement to accomplish this purpose is shown in Figure 3, wherein a lower poppet 72' is connected to an upper poppet 70' with a lost-motion connection. The lost-motion connection is provided by forming upper poppet 70' with a threaded hole 71 in the bottom into which is screwed a threaded bushing 73. The bushing 73 retains a threaded bolt 75 having the poppet 72' screwed on the bottom. The bushing 73 is screwed only part way into the hole 71 to allow bolt 75 to slide freely in the bushing.

The operation of the valves of Figure 3 is as follows: As the pressure builds up valve 72' closes. Due to the lost-motion connection, however, additional pressure acts upon the spring 94 (Figure 2) forcing poppet 72' upwardly until bolt 75 contacts upper poppet 70'. This lost motion is accomplished, however, only by overcoming the increasing resistance of the spring 94, which effectively adds to the differential pressures the rate of that spring. After the bolt 75 contacts upper poppet 70' there must be an additional build-up in pressure sufficient to overcome the seating pressures on poppet 70' before that poppet will open. When this point is reached poppet 70' snaps open similarly to poppet 70 of Figure 2. When the pressure recedes, poppet 70' will seat at the pressure at which lower poppet abuts upon the upper poppet 70' when the pressure is increasing. A further decrease in pressure, however, will not open poppet 72' because of the lost-motion connection. When the pressure decreases in amounts to where the spring 94 forces the stem 84 downwardly until it unseats poppet 72', the trapped fluid in cylinder port 62 will be released and the power valve of Figure 1 will return to its normal closed position. It is therefore apparent that the provision of a lost motion between the two poppets 70' and 72' effectively increases the differential pressure at which the pilot opens and closes dependent upon the amount of lost motion allowed to the poppet 72'.

This adjustment is useful in adapting the function of the present valve to various pressure differential requirements. There are various top pressures desirable for different hydraulic systems and consequently differential pressures. The pilot valve is adjusted to the top pressures by changing the rate of spring 94 by adding more spring units. The differential is adjusted by positioning bushing 73 within upper poppet 70'. Thus the present valve can meet a large variety of pressure requirements with but simple changes and adjustments.

The pilot valve 30 is superior to slide valves or cylinder valves such as are commonly used in regulators because it will not leak. In present-day hydraulic systems such as those used on aircraft the amount of hydraulic fluid must be held at a minimum to cut down on weight. Thus any regulator which leaks a small amount, for example a few drops a minute, is unsatisfactory because the pressure regulator for the system will be intermittently operated at frequent intervals lessening its life. The present pilot valve is free from leakage because poppet valves are used in which leakage can be reduced to zero through proper construction. Although piston operated poppet valves have been used in the past, the present pilot valve provides means to direct fluid pressure to a power device and to return the fluid to exhaust after operating the power device, thereby returning the power device and the stem 84 to its original position. The piston 98 can be made free from leakage as compared to a slide valve because a seal can be used whereas it is impossible to use a seal on a slide valve.

The pressure at which the upper poppet 70 can be made to open and close and the pressure at which the bottom poppet 72 may be made to open and close is regulated by the rate of the spring 94. In this regard a Belleville spring is highly desirable in that additional discs may be added to give a longer spring and thus a different rate. Minute adjustments as to pressure are handled by the adjustment screw 102. The pilot valves 30 therefore can be made to fit any desired operating pressures by very simple adjustments.

The valve 30 is also inexpensive to manufacture because of the co-axial alignment of all recesses and movable parts. Thus boring operations are possible with a minimum of set-ups, reducing manufacturing costs.

Although this invention has been described with reference to a particular embodiment thereof, it is not limited to this embodiment nor otherwise except by terms of the following claims.

I claim:

1. In a pilot valve, a valve housing having a pressure port, a cylinder port, an exhaust port, and a bore connecting said ports and having a valve seat formed therein between said pressure port and said cylinder port, a first poppet valve adapted to seat on said valve seat and sealing said pressure port from said cylinder port, a second poppet valve sealing said cylinder port from said exhaust port, said second poppet having a lost-motion connection with said first poppet, a seat for said second poppet having a variable axial position with regard thereto, and pressure responsive means governing the position of said second poppet valve seat and acting through said second poppet to open said first poppet.

2. In a valve, a housing having connecting small and large bores and an enlarged chamber at the outer end of the small bore forming a valve seat, said housing having a pressure port communicating with said chamber and with the outer end of the large bore, said housing having a cylinder port connecting to said small bore, said housing having an exhaust port connecting with at least one of said bores at a point toward the large bore with respect to said cylinder port, a piston in said large bore, a stem in said small bore connected to said piston and having a passage therein from the end remote from the piston to a region near the exhaust port, said passage forming a valve seat on said remote end of said stem, resilient means resisting movement of the piston toward the small bore, a poppet seated on said seat formed by the passage in said stem, and a second poppet seated on the seat formed at end of the small bore, sealing said bore from the pressure port, the effective pressure seating area of said valve seat on said small bore being at least as large as the cross sectional area of the stem.

3. In a valve, a housing having coaxial connecting large and small cylindrical bores with an enlarged chamber at the outer end of the small bore forming a valve seat at the bore, said housing having a pressure port communicating with the outer end of the large bore, and said chamber, said housing having a cylinder port connecting with the small bore and having an exhaust port connecting with at least one of said bores at a point near their junction, a piston in said large bore, a stem connected to said piston in said small bore and having a passage from the outer end toward an intermediate point adjacent to the exhaust opening said passage forming a valve seat at the outer end of the stem, resilient means resisting movement of said piston toward said small bore, a first poppet seated on said valve seat at the outer end of the small bore to seal the same from the pressure port, and a second poppet seated on said valve seat on said stem covering said passage and having an adjustable lost motion connection with said first poppet.

4. A valve comprising a housing having a main bore and, in axial sequence, a pressure port, a cylinder port, and an exhaust port, all communicating with said main bore; a first valve seat means in said main bore between said pressure port and said cylinder port; a first poppet adapted to seat on said first valve seat; movable means in said bore between said cylinder port and said exhaust port forming a second valve seat; a second poppet adapted to seat on said second valve seat and to lift said first poppet when said second poppet is moved toward said first poppet, the cross-sectional area of said movable means and said valve seat being at least as small as the seating area of said first poppet; and pressure responsive means to move said movable means to actuate said poppets.

WALTER C. TRAUTMAN.